United States Patent [19]

Wakimura

[11] 4,109,301

[45] Aug. 22, 1978

[54] ADAPTOR FOR PHOTOGRAPHIC FLASH DEVICE

[75] Inventor: Yutaka Wakimura, Osaka, Japan

[73] Assignee: West Electric Company, Ltd., Osaka, Japan

[21] Appl. No.: 740,673

[22] Filed: Nov. 10, 1976

[30] Foreign Application Priority Data

Nov. 14, 1975 [JP] Japan ............................ 50-155405[U]

[51] Int. Cl.² ............................................. G03B 15/02
[52] U.S. Cl. .......................................... 362/7; 362/8; 362/16; 362/293; 362/317
[58] Field of Search .................. 240/1.3; 362/7, 8, 16, 362/293, 317

[56] References Cited

U.S. PATENT DOCUMENTS 3,878,385  4/1975  Kingston ............................... 240/1.3

Primary Examiner—Stephen J. Lechert, Jr.
Attorney, Agent, or Firm—Cushman, Darby & Cushman

[57] ABSTRACT

The adaptor is used as a means which exchangeably installs an optical supplementary means such as panels or filters in order to effectively take the photograph with a photographic flash device, the adaptor comprising a mounting part which has convex or indent parts for coupling with indent or convex parts on the body of the photographic flash device, an installing frame for installing optical supplementary means therein, and a pyramid-shaped hood part which connects the installing part with the mounting part.

12 Claims, 2 Drawing Figures

ADAPTOR FOR PHOTOGRAPHIC FLASH DEVICE

BACKGROUND OF THE INVENTION

The present invention relates to an adaptor which installs an optical supplementary means such as panels or filters for changing radiation of light from a photographic flash device known as an artificial light source in photographing.

In photographing with a photographic flash device, it is well known to set up an optical supplementary means such as optical panel, for instance, light converging panel, light diffusing panel, light attenuator or color balancing filter, in front of a flashing part of the flash device. It is preferable that such optical supplementary means can be selectively set up to the flash device according to a condition of photographic object or a choice of persons who take photograph.

Conventional adaptors have been so constructed as to exchangeably install such optical supplementary means therein, but they have been only attached to the bodies of photographic flash devices by means of clips engaged by springs to the edge of the adaptors. Such conventional adaptors tend to slip out of their appropriate position or fall out of the flash device bodies due to any vibration or shock. In case the adaptors slip out of their appropriate position or fall out of the flash device bodies, not only effective photographing is not conducted, but also all manipulations of installing the optical supplementary means in the adaptors come to nothing. Further, since the adaptors had to be attached to the flash device by means of springs in the clips, the attaching manipulation requires some skill. Furthermore, since the conventional adaptors are equipped with such parts as clips and springs, numbers of parts are large. Moreover, since metals are employed as the materials for the clips, the cost of production is relatively high.

DETAILED DESCRIPTION OF THE INVENTION

Figure 1:
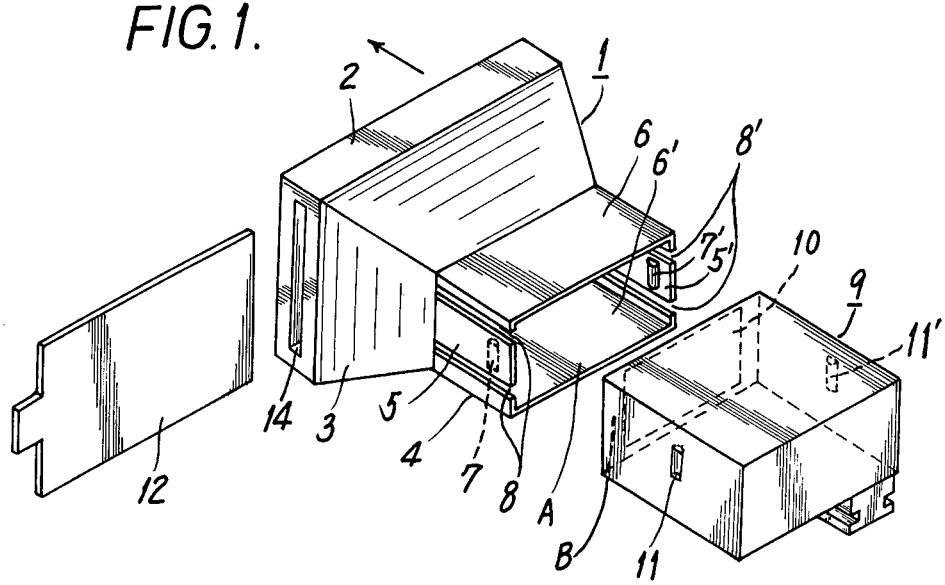
FIG. 1 shows a fragmental perspective view of an example of the adaptor according to the present invention, shown as mounted to a photographic flash device.
Figure 2:
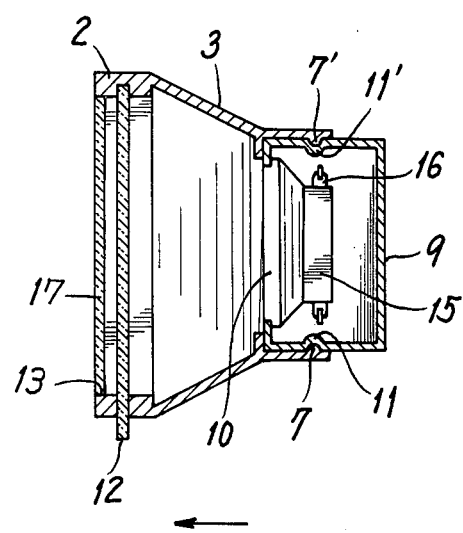
FIG. 2 shows a sectional planview of the adaptor of FIG. 1 mounted to the photographic flash device.

The present invention purports to provide an adaptor for photographic flash device which does not slip out of its appropriate position nor fall out of the flash device body even if suffering any vibration or shock and, besides, is easily manipulated and manufactured.

As shown in Figures, the adaptor 1 comprises an installing frame 2 in which an optical supplementary means 12 such as optical panel selected from the group of light converging panel, light diffusing panel, light attenuator and color balancing filter can be installed, a mounting part 4 for removably mounting the adaptor on a body 9 of a photographic flash device, and a pyramid-shaped hood part 3 located between, and connected to, the installing frame 2 and the mounting part 4 as shown in the drawing. The installing frame 2 comprises a window 13, with or without a light-transparent panel 17 such as plastics secured immediately in front of position where the optical supplementary means 12 is to be installed, and a slit 14 for installing the optical supplementary means 12 therefrom into the installing frame 2.

The mounting part 4 comprises resilient members 5, 5' having convex parts 7, 7' on the inner surface thereof and resilient holding members 6, 6'. The holding members 6, 6' are isolated from the members 5, 5' by groove parts 8, 8'. The dimensions in vertical and horizontal direction of the space A defined by the holding members 6, 6' and the resilient members 5, 5' are nearly equal to the outer dimensions in vertical and horizontal direction of the front face B with a flashing plane 10 thereon of the body 9 of the photographic flash device, respectively.

The installing frame 2, the hood part 3 and the mounting part 4 are moulded in one united body with resilient-synthetic resins such as ABS, i.e., acrylonitrile-butadienestyrene, or phenol system or with light metals such as aluminum duralumin, nickel or phosphor bronze.

As shown in the drawing, a reflecting means 15 is disposed behind the flashing plane 10 on the body 9 of the photographic flash device. A known flash discharge tube 16, which emits light when energized by electric energy charged in a capacitor, is secured in the reflecting means 15. Both sides of the body 9 of the flash device, respectively, are equipped with indent parts 11, 11' which are to be engaged in the convex parts 7, 7' on the resilient memebers 5, 5', respectively, for fixing the adaptor to the flash device body 9.

The adaptor 1 with such structure is mounted on the body 9 of the flash device as follows; The space A in the mounting part 4 of the adaptor 1 is first put in position to face the front face B of the flash device. Then, the mounting part 4 is pushed against the body 9 in a manner that the indent parts 11, 11' on the body 9 fit in the convex parts 7, 7' on the resilient members 5, 5', respectively.

In photographing, a selected optical supplementary means 12 such as panels or filters is inserted into the installing frame 2 from the slit 14. When flashed, the light from the flash device is optically modified by the optical supplementary means 12 into a desired light for irradiating the photographic object. Consequently, the photograph can be effectively taken.

After photographing, the adaptor 1 is easily demounted from the flash device body 9 by being pulled toward the arrow mark, thereby disengaging the convex parts 7, 7' on the resilient members 5, 5' from the indent parts 11, 11' on the body 9.

As a modified example, a convex part can be set up on either resilient members 5, 5'to mount the adaptor 1 on the flash device body 9. In order to fixedly mount the adaptor 1 on the flash device body 9, as another modified example, it is possible to set up some convex parts on the inner surface of the holding members 6, 6' and some indent parts for coupling with the convex parts on the surface of the flash device body 9. It is also possible to provide some indent parts instead of the convex parts 7, 7' on the inner surface of the resilient members 5, 5' and some convex parts instead of the indent parts 11, 11' on the surface of the flash device body 9.

In case a reflector is disposed on the inner surface of the hood part 3, the output light through the flashing plane 10 and through the optical supplementary means 12 increases because of less absorption by the inner surface of the hood part 3.

As mentioned above, the adaptor 1 of the present invention can be easily mounted to the flash device by coupling the convex or indent parts on the mounting part 4 with the indent or convex parts on the flash device. Additionally, the adaptor 1 can be surely fixed on the flash device body 9 by grasping the body 9 between the holding members 6, 6' and the resilient members 5, 5'.

As a result, the adaptor 1 can be fixedly mounted without being bumpy or demounted even in vibration or shock. Moreover, the adaptor 1 can be moulded in one united body because of its simple structure. The cost of production of the adaptor 1 becomes very low when synthetic resins are used as the materials.

What is claimed is:

1. A removable adaptor for exchangeably juxtaposing a supplementary optical panel, such as a light-converging, — diffusing, — attenuating or color-balancing filter panel in front of the substantially rectangular flashing plane of a photographic flash device body that has peripheral sidewall means which recede back from said flashing plane and include at least two opposed surfaces having first detent means provided thereon, said adaptor including:

substantially rectangular frame means including structure for receiving said panel therein;

rearwardly projecting mounting flange means having at least two opposed surfaces having second detent means provided thereon which are complementary with the first detent means and so arranged that when the mounting flange means is moved sufficiently axially towards the photographic flash device, the flange means becomes at least partially radially coincident with the peripheral sidewall means of the photographic flash device and the respective first and second detent means become engaged for removably mounting the adapter upon the photographic flash device; and a forwardly expanding, frusto-pyramidal hood extending between and connecting together the mounting flange means and the frame means.

2. The adaptor of claim 1, wherein;
the second detent means are concave indentations.

3. The adaptor of claim 1, wherein:
the second detent means are convex protuberances.

4. The adaptor of claim 1, wherein:
the frame means, mounting flange means and hood are provided as a unitary, integrated structure.

5. The adaptor of claim 1, further including:
the hood having an inner peripheral surface thereof lined with means providing a light-reflector.

6. The adaptor of claim 1, wherein:
the rearwardly projecting flange means is of tubular generally rectangular transverse cross-sectional shape so as to have a rearwardly projecting end; ad further including:
means defining a respective pair of longitudinally directed slots in said rearwardly projecting flange means for each second detent means, one member of the respective pair being adjacent but laterally displaced in one direction from the respective second detent means and the other member of that pair being adjacent but laterally displaced in the opposite direction from the respective second detent means, each second detent means thereby being disposed on a finger strip defined between the two slots of the respective pair, each finger strip being resiliently flexible relative to the remainder of said rearwardly projecting flange means to facilitate installation and removal of said adapter relative to the photographic flash device.

7. In combination:

a photographic flash device having a body with a forwardly-presented, substantially rectangular flashing plane and peripheral sidewall means which recede back from said flashing plane and include at least two opposed surfaces having first detent means provided thereon; and a removable adapter for exchangeably juxtaposing a supplementary optical panel, such as a light — converging, — diffusing, — attenuating or color balancing filter panel in front of said flashing plane said adapter including:

substantially rectangular frame means including structure for receiving said panel therein;

rearwardly projecting mounting flange means having at least two opposed surfaces having second detent means provided thereon which are complementary with the first detent means and so arranged that when the mounting flange means is moved sufficiently axially towards the photographic flash device, the flange means becomes at least partially radially coincident with the peripheral sidewall means of the photographic flash device and the respective first and second detent means becomes engaged for removably mounting the adapter upon the photographic flash device; and a forwardly expanding, frusto-pyramidal hood extending between and connecting together the mounting flange means and the frame means.

8. The apparatus of claim 7, wherein:
the second detent means are concave indentations.

9. The apparatus of claim 7, wherein:
the second detent means are convex protuberances.

10. The apparatus of claim 1, wherein:
the frame means, mounting flange means and hood are provided as a unitary, integrated structure.

11. The apparatus of claim 7, further including:
the hood having an inner peripheral surface thereof lined with means providing a light-reflector.

12. The apparatus of claim 7, wherein:
the rearwardly projecting flange means is of tubular generally rectangular transverse cross-sectional shape so as to have a rearwardly projecting end; and further including:

means defining a respective pair of longitudinally directed slots in said rearwardly projecting flange means for each second detent means, one member of the respective pair being adjacent but laterally displaced in one direction from the respective second detent means and the other member of that pair being adjacent but laterally displaced in the opposite direction from the respective second detent means, each second detent means thereby being disposed on a finger strip defined between the two slots of the respective pair, each finger strip being resiliently flexible relative to the remainder of said rearwardly projecting flange means to facilitate installation and removal of said adapter relative to the photographic flash device.

* * * * *